(12) United States Patent
Desing et al.

(10) Patent No.: US 10,975,924 B2
(45) Date of Patent: Apr. 13, 2021

(54) FLUID CONTROL APPARATUS FOR USE WITH VEHICLE CLUTCHES

(71) Applicant: JTEKT AUTOMOTIVE NORTH AMERICA, INC., Plymouth, MI (US)

(72) Inventors: Patrick Desing, Simpsonville, SC (US); Shun Ono, Novi, MI (US); Mike Kocevar, Toledo, OH (US); Junji Ando, Novi, MI (US); Kenji Korenaga, Aichi (JP)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 59 days.

(21) Appl. No.: 16/241,485

(22) Filed: Jan. 7, 2019

(65) Prior Publication Data
US 2020/0217375 A1 Jul. 9, 2020

(51) Int. Cl.
| F16H 57/04 | (2010.01) |
| F16D 23/12 | (2006.01) |
| B60K 23/08 | (2006.01) |
| F16D 13/74 | (2006.01) |
| F16D 27/115 | (2006.01) |

(52) U.S. Cl.
CPC .... *F16D 27/115* (2013.01); *B60K 2023/0833* (2013.01); *B60K 2023/0858* (2013.01); *F16D 13/74* (2013.01); *F16D 2023/123* (2013.01); *F16H 57/0424* (2013.01); *F16H 57/0428* (2013.01); *F16H 57/0473* (2013.01)

(58) Field of Classification Search
CPC ..... F16N 7/36–363; F16H 57/02–0498; F16D 23/08–2023/0858; F16D 2023/123; F16D 13/74; B60K 17/344–3467
See application file for complete search history.

(56) References Cited

U.S. PATENT DOCUMENTS

| 8,428,838 | B2* | 4/2013 | Kondo | B60K 23/08 |
| | | | | 701/69 |
| 9,303,754 | B2* | 4/2016 | Nett | F16D 25/12 |
| 9,664,253 | B2* | 5/2017 | Gall | F16H 1/00 |
| 10,274,074 | B1* | 4/2019 | Alexiou | B60K 17/34 |
| 2020/0018388 | A1* | 1/2020 | Alexiou | B60K 17/28 |
| 2020/0079212 | A1* | 3/2020 | Legl | F16H 57/0424 |

FOREIGN PATENT DOCUMENTS

| JP | 58-150650 U | | 10/1983 | |
| JP | 04321863 A | * | 11/1992 | ......... F16H 57/0483 |
| JP | 2013-253615 A | | 12/2013 | |

* cited by examiner

*Primary Examiner* — Ernesto A Suarez
*Assistant Examiner* — James J Taylor, II
(74) *Attorney, Agent, or Firm* — Oblon, McClelland, Maier & Neustadt, L.L.P.

(57) ABSTRACT

Fluid control apparatus for use with vehicle clutches are disclosed. A disclosed clutch coupling assembly for a vehicle includes a housing defining a cavity. The clutch coupling assembly also includes a fluid reservoir fluidly coupled to the cavity. The clutch coupling assembly also includes a clutch positioned in the cavity. Rotation of the clutch is to convey a fluid from the cavity to the fluid reservoir. The clutch coupling assembly also includes a pump operatively coupled to the housing to control the fluid. Operation of the pump is to convey the fluid from the fluid reservoir to the cavity when the clutch is in an engaged state.

17 Claims, 8 Drawing Sheets

FLUID CONTROL APPARATUS FOR USE WITH VEHICLE CLUTCHES

FIELD OF THE DISCLOSURE

This disclosure relates generally to vehicles and, more particularly, to fluid control apparatus for use with vehicle clutches.

BACKGROUND

Motor vehicles typically employ clutch systems to facilitate transferring torque from an engine to a vehicle driveshaft and/or a vehicle axle. Some vehicle clutch systems utilize fluids (sometimes referred to as wet clutches) such as oil for moving components (e.g., a clutch pack) of a clutch to cool and/or lubricate the components, which improves clutch performance and/or increases a lifespan of the clutch. Typically, the clutch is immersed in an oil bath within a sealed cavity of a housing.

SUMMARY

An example clutch coupling assembly for a vehicle includes a housing defining a cavity. The clutch coupling assembly also includes a fluid reservoir fluidly coupled to the cavity. The clutch coupling assembly also includes a clutch positioned in the cavity. Rotation of the clutch is to convey a fluid from the cavity to the fluid reservoir. The clutch coupling assembly also includes a pump operatively coupled to the housing to control the fluid. Operation of the pump is to convey the fluid from the fluid reservoir to the cavity when the clutch is in an engaged state.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are known to scale. In general, the same reference numbers will be used throughout the drawing(s) and accompanying written description to refer to the same or like parts.

DETAILED DESCRIPTION

Figure 1:
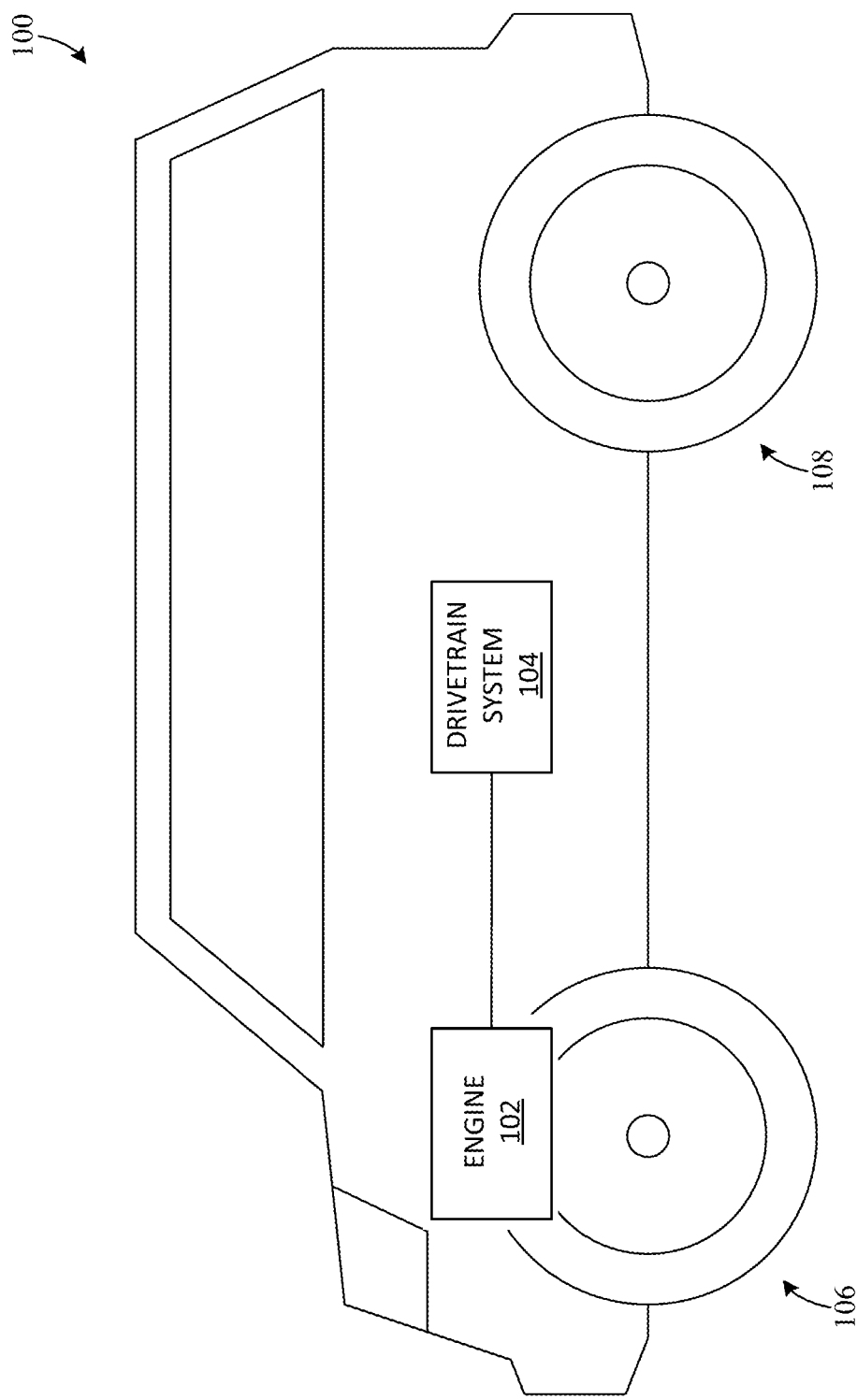
FIG. 1 is a view of an example vehicle in which examples disclosed herein can be implemented.

Some known clutch couplings (e.g., an intelligent torque-controlled coupling (ITCC)) enable a vehicle to change between two-wheel drive and four-wheel drive (sometimes referred to as all-wheel drive) functionality, which improves vehicle performance and/or handling in certain driving conditions. A known clutch coupling may be operatively coupled between a propeller shaft and a rear axle of the vehicle to transfer torque therebetween as a result of interaction between plates of a clutch. For example, to engage the clutch, a cam operatively coupled to the clutch strokes to squeeze inner and outer clutch plates together, thereby generating torque for the rear axle and/or rear road wheels of the vehicle. Sometimes, these clutch plates are preloaded by the cam such that the clutch plates are engaged or contacting each other even when the vehicle is operating in two-wheel drive (i.e., when the clutch is disengaged), which adversely affects vehicle fuel economy as a result of energy loss by this engagement of the clutch plates. Additionally, these known clutch coupling, may utilized oil that is permanently contained in a clutch cavity in which the clutch is positioned, which further adversely affects the vehicle fuel economy when in two-wheel drive by increasing fluid drag on the clutch plates and/or other moving components associated therewith.

To account for such undesired energy loss caused by preloaded clutch plates, some known clutch couplings are configured to substantially reduce and/or eliminate a load imparted the clutch plates such that the clutch plates are at least partially separated from each other. However, the oil in the clutch cavity still causes at least some torque to transfer between the clutch plates despite the clutch plates being disengaged and/or separated from each other, which prevents the propeller shaft from disconnecting form the rear axle. As a result, these known clutch couplings do not allow for disconnecting driveline architecture for vehicles.

Fluid control apparatus for use with vehicle clutches are disclosed. Examples disclosed herein provide a clutch coupling assembly for a vehicle including a clutch that is operatively coupled to a housing and configured to transfer torque between a driveshaft (e.g., a propeller shaft) and an axle (e.g., a rear axle) and/or road wheels of the vehicle based on a state of the clutch. The disclosed clutch is positioned in a cavity formed by the housing that, receives a fluid (e.g., as oil) to improve clutch performance and/or part life when the clutch is engaged. In particular, disclosed examples enable the fluid to substantially evacuate from the cavity when the clutch is disengaged (i.e., when the vehicle is in two-wheel drive) and fill the cavity when the clutch is engaged (i.e., when the vehicle is in four-wheel drive). In this manner, fluid drag experienced by one or more components (e.g., clutch plates) of the clutch is substantially reduced and/or eliminated when the vehicle is operating in two-wheel drive. Thus, disclosed examples improve vehicle fuel economy and, in some examples, also allow for the driveshaft to sufficiently disconnect from the axle and/or the road wheels when the clutch is disengaged.

To direct the fluid out of the cavity, some disclosed examples provide a first channel that is fluidly coupled to the first cavity to convey the fluid in response to rotation of the clutch. For example, as a housing (e.g., a drum) of the clutch rotates, the fluid is urged radially outward relative to an axis of the clutch and into an inlet of the first channel. The first channel extends away from the cavity to a fluid reservoir (e.g., a catch tank coupled to the housing) that is separate from the cavity to store the fluid. In this manner, when the axle and/or the road wheels cause the clutch housing to rotate, the fluid flows through the first channel at a first flow rate from the clutch cavity to the fluid reservoir based on one or more parameters (e.g., a rate of rotation, a size, a shape, etc.) of the clutch component(s) and/or one or more parameters (e.g., a cross-sectional area, a length, etc.) of the first channel.

To direct the fluid out of the fluid reservoir and back into the cavity, some disclosed examples provide a pump that is fluidly coupled between the fluid reservoir and the clutch cavity via a second disclosed channel, different from the first channel, extending from the fluid reservoir to the pump. In particular, when in operation, the disclosed pump is configured to draw the fluid from an outlet of the second channel and convey the fluid to the cavity. In some examples, the pump includes a shaft fixedly coupled between the driveshaft and a portion (e.g., one or more inner plates or discs) of the clutch to transfer torque therebetween. As such, output from a vehicle engine can be advantageously utilized to operate the pump (e.g., when the vehicle is in four-wheel drive). As the shaft rotates, one or more grooves (e.g., helical grooves) extending along an outer surface of the shaft carry the fluid from the outlet of the second channel to the cavity. However, when the shaft is stationary and/or otherwise not rotating, the fluid is prevented from flowing through the grooves and accumulates in the fluid reservoir. In this manner of operating the pump, the fluid flows through the second channel and/or across the pump at a second flow rate from the fluid reservoir to the cavity based on one or more parameters (e.g., a rate of rotation of the driveshaft, a cross-sectional area of the grooves, a length of the grooves, etc.) associated with the pump and/or one or more parameters (e.g., a cross-sectional area, a length, etc.) of the second channel.

The disclosed components of the clutch coupling assembly are sized, shaped, structured, and/or otherwise configured such that when the vehicle is operating in two-wheel drive, the first flow rate of the fluid out of the cavity is greater than the second flow rate of the fluid into the cavity, which substantially empties the fluid from the cavity. Further, when the vehicle is operating in four-wheel drive, the second flow rate of the fluid into the cavity is greater than the first flow rate of the fluid out of the cavity, which substantially fills the cavity with the fluid. As a result of this circulation of the fluid through the firsts and second channels of the clutch coupling assembly, disclosed examples improve thermal characteristics of and/or effectively cool one or more components positioned in the housing such as, for example, a clutch pack and/or an electric coil or solenoid operatively coupled to the clutch.

Further, some disclosed examples substantially disconnect the driveshaft from the vehicle engine when the vehicle is operating in two-wheel drive, for example, via another clutch operatively coupled between the driveshaft and the engine. In such examples, the clutch coupling assembly includes an example cam that is operatively coupled to the clutch and strokes to squeeze the clutch plates together. In particular, the disclosed cam is structured and/or configured such that when the clutch is in disengaged and the driveshaft is disconnected from the engine, the clutch plates separate from each other to prevent any torque from being imparted on the driveshaft. In this manner, the driveshaft and, thus, the shaft of the pump do not rotate when the vehicle is operating in two-wheel drive.

As a result, the disclosed vehicle clutch coupling assembly reduces costs by reducing parts typically associated with the above mentioned known clutch couplings. Further, disclosed examples can be advantageously applied to other clutch coupling architectures such as, for example, a twin clutch disconnect system.

FIG. 1 is a view of an example vehicle (e.g., a car, a truck, a sport utility vehicle (SUV), etc.) 100 in which examples disclosed herein can be implemented. According to the illustrated example of FIG. 1, the vehicle 100 includes an example engine (e.g., an internal combustion engine) 102, an example drivetrain system 104, and one or more examples wheels (sometimes referred to as road wheels), two of which are shown in this examples, i.e., a first or front wheel 106 and a second or rear wheel 108). The drivetrain system 104 of FIG. 1 is structured and/or configured to transfer torque from the engine 102 to the wheel(s) 106, 108 to cause the vehicle 100 to move, for example, via one or more driveshafts, one or more clutches, one or more axles, etc., as discussed further below.

In particular, the drivetrain system 104 of FIG. 1 enables the vehicle 100 to change between a first driving mode (e.g., two-wheel drive) that is associated with a first driving characteristic of the vehicle 100 and a second driving mode four-wheel drive) that is associated with a second driving characteristic of the vehicle 100 different from the first driving characteristic. For example, a controller (e.g., an electronic control unit (ECU)) of the vehicle 100 transmits power and/or a control or command signal to an actuator system (e.g., the example actuator system 346 of FIGS. 3 and 6) that is associated with the drivetrain system 104 and operatively coupled to a clutch. In response, the actuator system causes the clutch to change between a disengaged state and an engaged state, thereby providing the respective first and second driving modes of the vehicle 100. When the vehicle 100 is operating in first driving mode, the drivetrain system 104 transfers output from the engine 102 to only the front wheel(s) 106 or the rear wheels) 108. However, when the vehicle 100 is operating in the second driving mode, the drivetrain system 104 transfers the output from the engine 102 to all of the front and rear wheels 106, 108.

Figure 2:
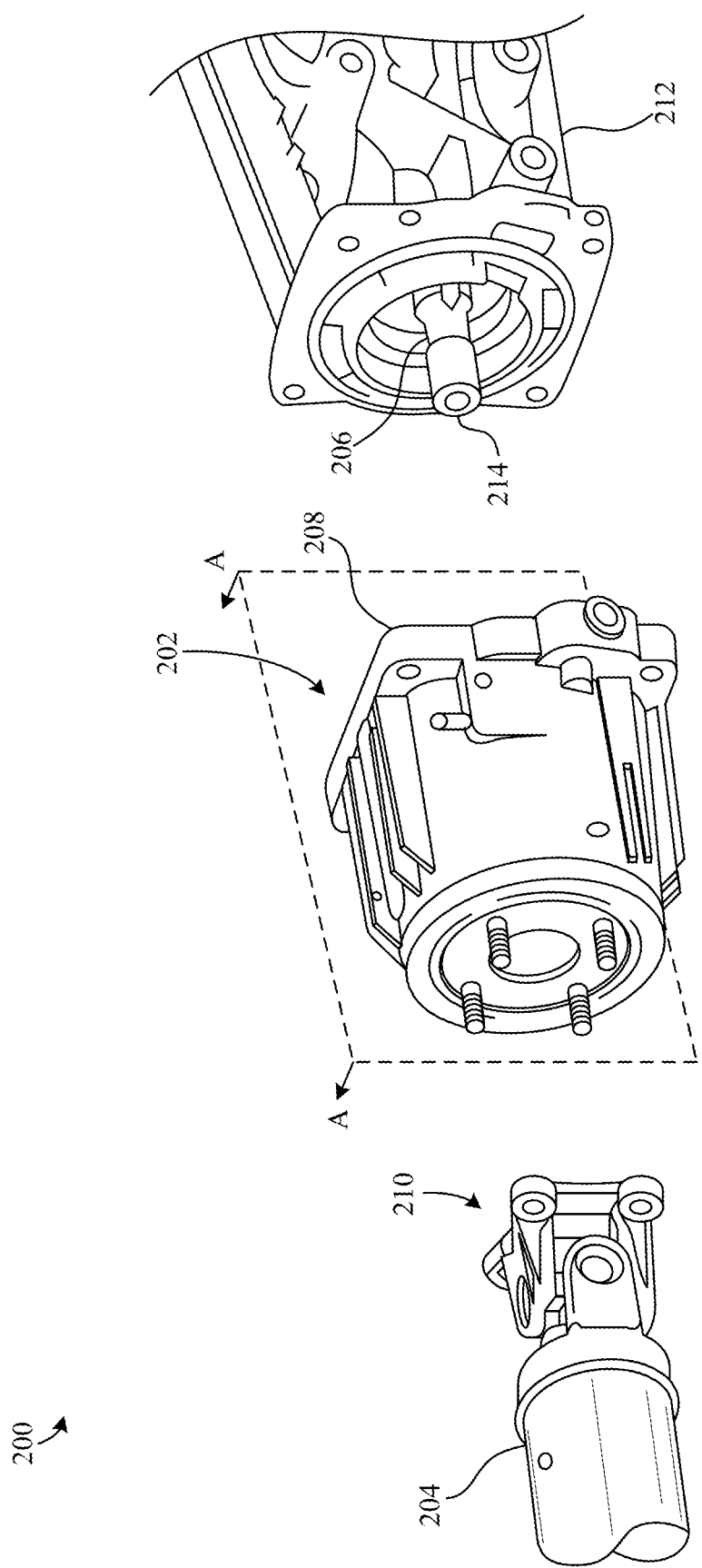
FIG. 2 is a partial exploded-view of an example drivetrain system and shows an example clutch coupling assembly in accordance with the teachings of this disclosure.

FIG. 2 is a partial exploded-view of an example drivetrain system 200 and shows an example clutch coupling assembly 202 in accordance with the teachings of this disclosure. In some examples, the drivetrain system 200 of FIG. 2 corresponds to at least a portion of the drivetrain system 104 of FIG. 1. The drivetrain system 200 of FIG. 2 includes the clutch coupling assembly 202, which is operatively coupled between a first or input shaft (e.g., a propeller shaft) 204 and a second or output shaft 206 to transfer torque therebetween. The clutch coupling assembly 202 of FIG. 2 includes a first example housing 208 (sometimes referred to as a coupling housing or an outer housing) having one or more components at least partially positioned therein to facilitate transferring the torque such as, for example, one or more shafts, one or more bearings, one or more clutches, etc., which is discussed further below in connection with FIG. 3.

The first shaft 204 of FIG. 2 is operatively coupled to the engine 102 to receive a first torque therefrom (e.g., when the vehicle 100 is in the second driving mode) and impart the first torque on a portion of the clutch coupling assembly 202. The first shaft 204 couples to a portion of the clutch coupling 202, for example, via one or more fasteners (e.g., bolts, screws, nuts, etc.). The first shaft 204 may include an example joint (e.g., a universal joint) 210 interposed between the first shaft 204 and the clutch coupling assembly 202 to facilitate torque transfer and/or positioning the first shaft 204. In some examples, when the vehicle 100 is operating in the first driving mode, the first shaft 204 does not rotate. That is, the first shaft 204 does not receive, a torque from the engine 102 or the clutch coupling assembly 202. In such examples, one or more components (e.g., a clutch) are operatively interposed between the first shaft 204 and the engine 102 to connect the first shaft 204 to the engine 102 as well as disconnect the first shaft 204 from the engine 102.

The second shaft 206 of FIG. 2 is operatively coupled to one or more vehicle wheels (e.g., the rear wheel(s) 108 of FIG. 1), for example, via a differential gear system positioned within a second example housing 212(sometimes referred to as a drive axle housing). The second housing 212 of FIG. 2 is fixedly coupled to a portion (e.g., the chassis) of the vehicle 100, for example, via one or more fasteners and/or fastening methods or techniques. In particular, the second shaft 206 receives a second torque from the clutch coupling 202 that is based on the first torque when the vehicle 100 is operating in the second driving mode, which causes the rear wheel(s) 108 to rotate. However, when the vehicle 100 is operating in the first driving anode, the clutch coupling assembly 202 does not impart the second torque or imparts a relatively small degree of the second torque on the second shaft 206. The second shaft 206 includes, a pinion gear 214 to facilitate coupling to a portion (e.g., a drum) of the clutch coupling assembly 202.

Figure 3:
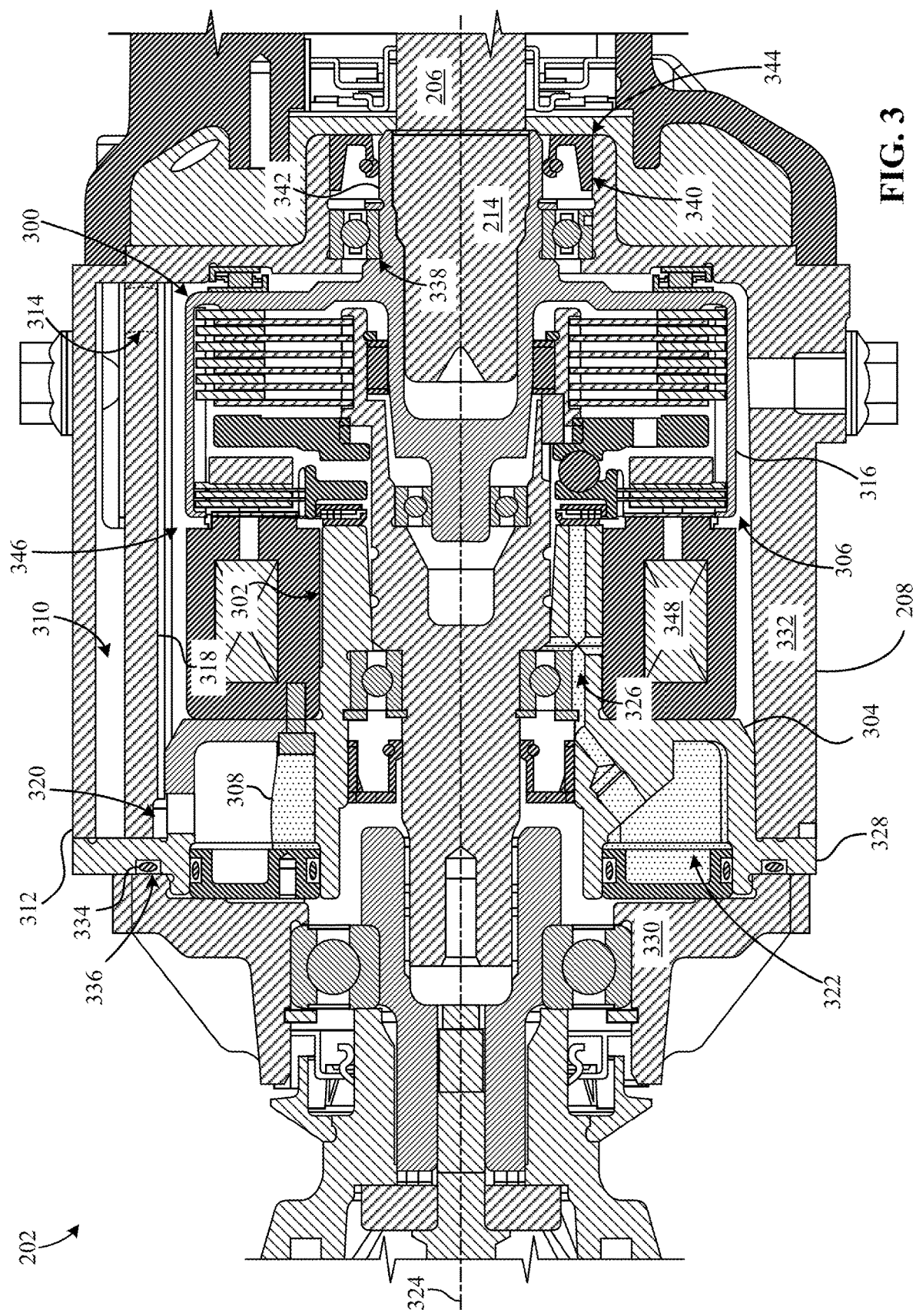
FIG. 3 is a cross-sectional view of the example clutch coupling assembly of FIG. 2 along line A-A and shows an example clutch, an example pump, and an example tank in accordance with the teachings of this disclosure.

FIG. 3 is a cross-sectional view of the clutch coupling assembly 202 of FIG. 2 along line A-A and shows an example clutch 300, an example pump 302, and an example tank 304 (sometimes referred to as a catch tank) in accordance with the teachings of this disclosure. The clutch 300 is positioned in a first example cavity 306 (sometimes referred to as a clutch cavity) defined at least, partially by the housing 208 and/or the tank 304 to receive an example fluid (e.g., oil) 308. As shown in FIG. 3, the fluid 308 is substantially contained in the tank 304. As will be discussed in greater detail below, disclosed examples control and/or direct the fluid 308 to evacuate from the first cavity 306 when the clutch 300 is in a disengaged state such that the clutch 300 does not interact with the fluid 308 or s substantially unaffected thereby, which reduces and/or eliminates fluid drag experienced by one or more moving clutch components (e.g., one or mote clutch discs or plates) to improve vehicle fuel economy. Further, disclosed examples control and/or direct the fluid 308 to at least partially fill the first cavity 306 when clutch 300 is in an engaged state such that the clutch 300 is at least partially immersed in the fluid 308, which lubricates the moving component(s) of the clutch 300, improves clutch performance, and/or increases part life.

The first cavity 306 of FIG. 3 is in fluid communication with the tank 304 to provide the fluid 308 thereto and/or receive the fluid 308 therefrom. In particular, to facilitate conveying the fluid 308, the clutch coupling assembly 202 includes a first example channel 310 that extends away from the first cavity 306 to the tank 304, thereby fluidly coupling the tank 304 to the first cavity 306. The first channel 310 of FIG. 3 is sized and/or shaped to allow a sufficient amount of the fluid 308 to flow therethrough. In some examples, the first channel 310 is at least partially formed by the first housing 208 and/or one or more components associated therewith (e.g., a fluid line such as a tube or pipe). As shown in FIG. 3, the first channel 310 extends at least partially through an outermost and/or topmost (in the orientation of FIG. 3) portion 312 of the first housing 208 along a path (e.g., a linear and/or a curved path).

The first channel 310 of FIG. 3 has an inlet 314 (as represented by the dotted, dashed lines in FIG. 3) positioned proximate to a third housing (e.g., a drum) 316 (sometimes referred to as a clutch housing) of the clutch 300 to allow the fluid 308 to flow out of the first cavity 306 and into the first channel 310 in response to rotation of the third housing 316. In some examples, the inlet 314 includes an aperture formed by an inner surface (e.g., a circumferential surface) 31 of the first housing 208. As shown in FIG. 3, the inlet 314 is positioned at or near the portion 312 of the first housing 208. The first channel 310 also has an outlet 320 positioned proximate to the tank 304 to allow the fluid 308 to flow out of the first channel 310 and into a second cavity 322 defined by the tank 304 separate from the first cavity 306. As the third housing 316 of the clutch 300 rotates relative to a first example axis 324 associated therewith, the fluid 308 is forced or urged radially outward relative to the first axis 324 away from the clutch 300 and into the inlet 314 of the first channel 310. As a result, the fluid 308 flows through the first channel 310 from the first cavity 306 to the second cavity 322.

Further, the pump 302 of FIG. 3 is operatively coupled to the first housing 208 and in fluid communication with the second cavity 322 and the first cavity 306. In particular, when in operation, the pump 302 is structured and/or configured to draw the fluid 308 from the second cavity 322 and transmit the fluid 308 to the first cavity 306, as discussed further below in connection with FIGS. 4 and 5. To similarly facilitate conveying the fluid 308, the clutch coupling assembly 202 includes a second example channel 326 that extends from the second cavity 322 to the pump 302, thereby fluidly coupling the second cavity 322 to the first cavity 306 via the pump 302. The second channel 326 of FIG. 3 is sized and/or shaped to allow a sufficient amount of the fluid 308 to flow therethrough. In some examples, the second channel 326 is at least partially formed by the tank 304 and/or one or more components associated therewith (e.g., a tube or pipe). In some examples, at least a portion of the pump 302 receives input from the first shaft 204. In this manner, output of the engine 102 is utilized to operate the pump.

Although FIG. 3 depicts only two channels 310, 326, in some examples, the clutch coupling assembly 202 includes one or more other channels in addition or alternatively to the first channel 310 and/or the second channel 326 for fluidly coupling the cavities 306, 322 together. In some examples, the first channel 310, the tank 304, and the second channel 326 of FIG. 3 are considered to form a single fluid path along which the fluid 308 flows.

The tank 304 of FIG. 3 is structured and/or configured to couple (e.g., removably couple) to the first housing 208, for example via an example flange (e.g., an outer radial flange) 328 that is clamped between a first portion 330 and a second portion 332 of the first housing 208. As shown in FIG. 3, the first portion 330 includes an opening 333 to receive at least a portion of the first shaft 204 and/or one or more components associated therewith. In some examples, the tank 304 is positioned in the first housing 208 such that tank 304 at least partially forms the first cavity 306 with the inner surface 318 of the first housing 208. In such examples, to facilitate sealing the first cavity 306, the clutch coupling assembly 202 includes one or more seals that are operatively coupled between the tank 304 the portion(s) 330, 332 of the first housing 208 to prevent the fluid 308 from leaking out of the housing 208. For example, a first example seal (e.g., an O-ring) 334 is clamped between the flange 328 and the first portion 330 of the first housing 208. In such examples, the first seal 334 is positioned in a first seal groove 336 formed by the flange 328 that extends at least partially around the first axis 324 at or near an outer radius of the tank 304.

The clutch 300 of FIG. 3 is structured and/or configured to transfer torque between the first shaft 204 and the second shaft 206 based on a state of the clutch 300. For example, when the clutch 300 is in a first or disengaged state, the clutch 300 does not transfer the first torque to the second shaft 206. Conversely, when the clutch 300 is in a second or engaged state, the clutch 300 transfers at least a portion of the first torque to the second shaft 206. The third housing 316 of the clutch 300 is positioned in the first cavity 306 and rotatably coupled to the first housing 208, for example, via a first bearing (e.g., a radial ball bearing) 338. The first bearing 338 of FIG. 3 is coupled between the third housings 316 and the second portion 332 of the first housing 208. In such examples, to further seal the first cavity 306, the clutch coupling assembly 202 includes a second example seal 340 sealingly engaged between an outer surface 342 of the third housing 316 and a portion of the inner surface 318 defining an opening 344 in the second portion 332 of first housing 208 that receives the second shaft 206 and/or the pinion gear 14.

In some examples, to control a state of the clutch 300, the clutch coupling assembly 202 includes an example actuator system 346, which is discussed further below in connection with FIGS. 6-8. In particular, the actuator system 346 of FIG. 3 includes an example solenoid 348 that generates a magnetic field and/or force for actuating the clutch 300, for example, in response to receiving the power and/or the control or command signal from the controller of the vehicle 100. As such, the solenoid 348 is communicatively coupled to the vehicle controller, for example, via a signal or transmission wire for providing power and/or communication. The solenoid 348 is also coupled to the tank 304 adjacent the clutch 300, for example, via one or more example fasteners and/or fastening techniques or methods.

According to the illustrated example of FIG. 3, the fluid 308 flows through the first channel 310 at a first flow rate that is based on one or more parameters associated with the clutch 300 such as, for example, a size, a shape, and/or a rate of rotation (e.g., revolutions per minute (RPM)) of the third housing 316. Further, the fluid 308 flows through the second channel 326 and/or across the pump 302 at a second flow rate that is based on one or more parameters associated with the pump 302 such as, for example rate of rotation of the first shaft 204 providing input to the pump 302 in addition to a size and/or shape of one air more example groove(s) 402, 404 (shown in FIGS. 4 and 5) for carrying the fluid 308. In particular, when operating and/or driving the vehicle 100 in the first driving mode, the first flow rate is greater than the second flow rate such that the fluid 308 evacuates from the first cavity 306 until a first steady state fluid level is reached in the first cavity 306. Conversely, when operating and/or driving the vehicle 100 in the second driving mode, the second flow rate is greater than the first flow rate such that the fluid 308 fills the first cavity 306 until a second steady state fluid level is reached in the first cavity 306 greater than the first steady state fluid level.

Figure 4:
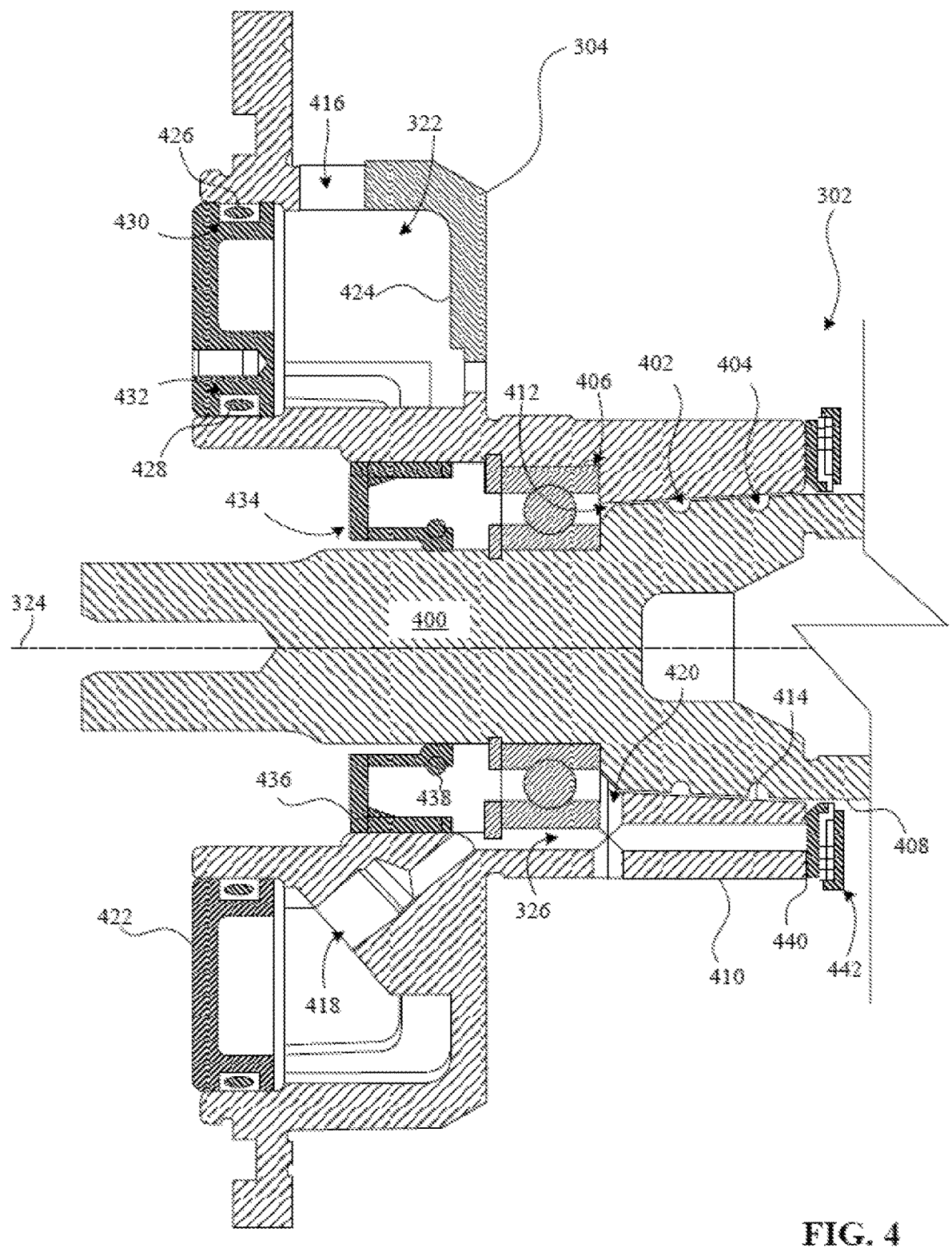
FIG. 4 is an enlarged portion-view of the example pump and the example tank of FIG. 3.

FIG. 4 is an enlarged portion-view of the pump 302 and the tank 304 of FIG. 3. As shown in FIG. 4, the pump 302 includes a third example shaft 400 at least partially positioned in the first cavity 306 that couples to the first shaft 204 and a portion (e.g., one or more clutch discs or plates) of the clutch 300 to transfer the first torque therebetween. For example, the first shaft 204 imparts the first torque on the third shaft 400 and, in response, the third shaft 400 imparts the first torque on the portion of the clutch 300. As a result, the third shaft 400 and at least the portion of the clutch 300 rotate cooperatively relative to the first axis 324. In particular, the third shaft 400 of FIG. 4 includes the aforementioned groove(s) (e.g., helical groove(s)) 402, 404 to convey the fluid 308 toward the clutch 300 and/or the first cavity 306 as the third shaft 400 rotates, as discussed further below in connection with FIG. 5.

The third shaft 400 of FIG. 4 is rotatably coupled to the tank 304 and/or the first housing 208, for example, via a second bearing (e.g., a radial ball bearing) 406. The second bearing 406 of FIG. 4 is interposed between an outer surface (e.g., a circumferential surface) 408 of the third shaft 400 and a wall (e.g., a cylindrical wall) 410 of the pump 302. In some examples, a relatively small space or channel (e.g., an annular channel) 412 exists between the outer surface 408 of the third shaft 400 and an inner surface 414 of the wall 410, which allows the third shaft 400 to rotate relative to the wall 410 without interfering therewith. Additionally, in some examples, when the pump 302 is not operating (e.g., the third shaft 400 is not rotating), the fluid 308 is prevented from flowing out of the second cavity 322 and/or into, the first cavity 306. That is, in such examples, the fluid 308 does not flow through the groove(s) 402, 404 and/or the space 412 or flows at a relatively low rate therethrough.

To receive the fluid 308 from the outlet 320 of first channel 310, the tank 304 of FIG. 4 includes an opening 416 that, in this example, is positioned at or near a topmost tin the orientation of FIG. 3) portion of the tank 304 and extends through the tank 304 to the second cavity 322. Further, in some examples, the second channel 326 has an inlet 418 positioned at or near a bottommost (in the orientation of FIG. 4) portion of the tank 304 to receive the fluid 308 from the second cavity 322, which allows gravity to urge the fluid 308 into and/or through the second channel 326 to feed the pump 302. As shown in FIG. 4, the second channel 326 extends at least partially through the wall 410 of the tank 304 adjacent the third shaft 400. In particular, the second channel 326 also includes an outlet 420 positioned proximate to a portion of the outer surface 408 of the third shaft 400 having the groove(s) 402, 404, which allows the fluid 308 to flow out of the second channel 326 and into the groove(s) 402, 404 when the third shaft 400 rotates.

The tank 304 of FIG. 4 includes an example cover (e.g., an annular disc) 422 coupled thereto to partially define the second cavity 322 with an inner surface 424 of the tank 304. In some examples, the second cavity 322 of the tank 304 is sized and/or shaped to contain substantially all of the fluid 308 such that the first cavity 306 is able to substantially or entirely empty when the clutch 300 is in the disengaged state and/or the pump 302 is operation. As shown in FIG. 4, the tank 304 at least partially surrounds the third shaft 400. Further, in some examples, the tank 304 and the pump 302 are substantially concentric.

In some examples, the facilitate sealing the second cavity 322, the tank 304 includes one or more example seals (e.g., O-ring(s)) 426, 428, operatively coupled between the cover 422 and the inner surface 424 of the tank 304, two of which are shown in this example (i.e., a third seal 426 and a fourth seal 428). In some examples, the third seal 426 is positioned in a second example seal groove 430 formed by the cover 422 at or near an outer radius of the cover 422. Further, in some examples, the fourth seal 428 is positioned in a third example seal groove 432 formed by the cover 422 at or near an inner radius of the cover 422.

As shown in FIG. 4, the wall 410 of the pump 302 is coupled to the tank 304 and/or extends away therefrom along the first axis 324 toward the clutch 300 to at least partially form the first cavity 306 with the first housing 208. In some such examples, to further seal the first cavity 306, the clutch coupling assembly 202 includes a fifth example seal (e.g., similar to second seal 340) 434 interposed between the outer surface 408 of the third shaft 400 and the tank 304 and/or the inner surface 414 of the wall 410. The fifth seal 434 of FIG. 4 includes an annular portion 436 that is concentrically disposed on the third shaft 400 and has a U-shaped cross-section in this example. Further, the fifth seal 434 also includes a ring portion 438 surrounding and coupled to an inner surface of the annular portion 436 to urge the annular portion 436 into sealing engagement with the Outer surface 408 of the third shaft 400. Although FIG. 4 depicts aspects of the fifth seal 434, in some examples, such aspects likewise apply to one or more other seals associated with the clutch coupling assembly 202 such as, for example, the second seal 340 of FIG. 3.

As shown in FIG. 4, the wall 410 includes an end 440 to receive a third example bearing 442. The third bearing 442 of FIG. 4 is coupled to and/or positioned on the end 440 of the wall 410 and concentrically disposed relative to the third shaft 400. In particular, the third bearing 442 receives and supports a part (e.g., a cam) of the actuator system 346, which allows the part to rotate relative to the wall 410, as discussed further below in connection with FIG. 6.

Figure 5:
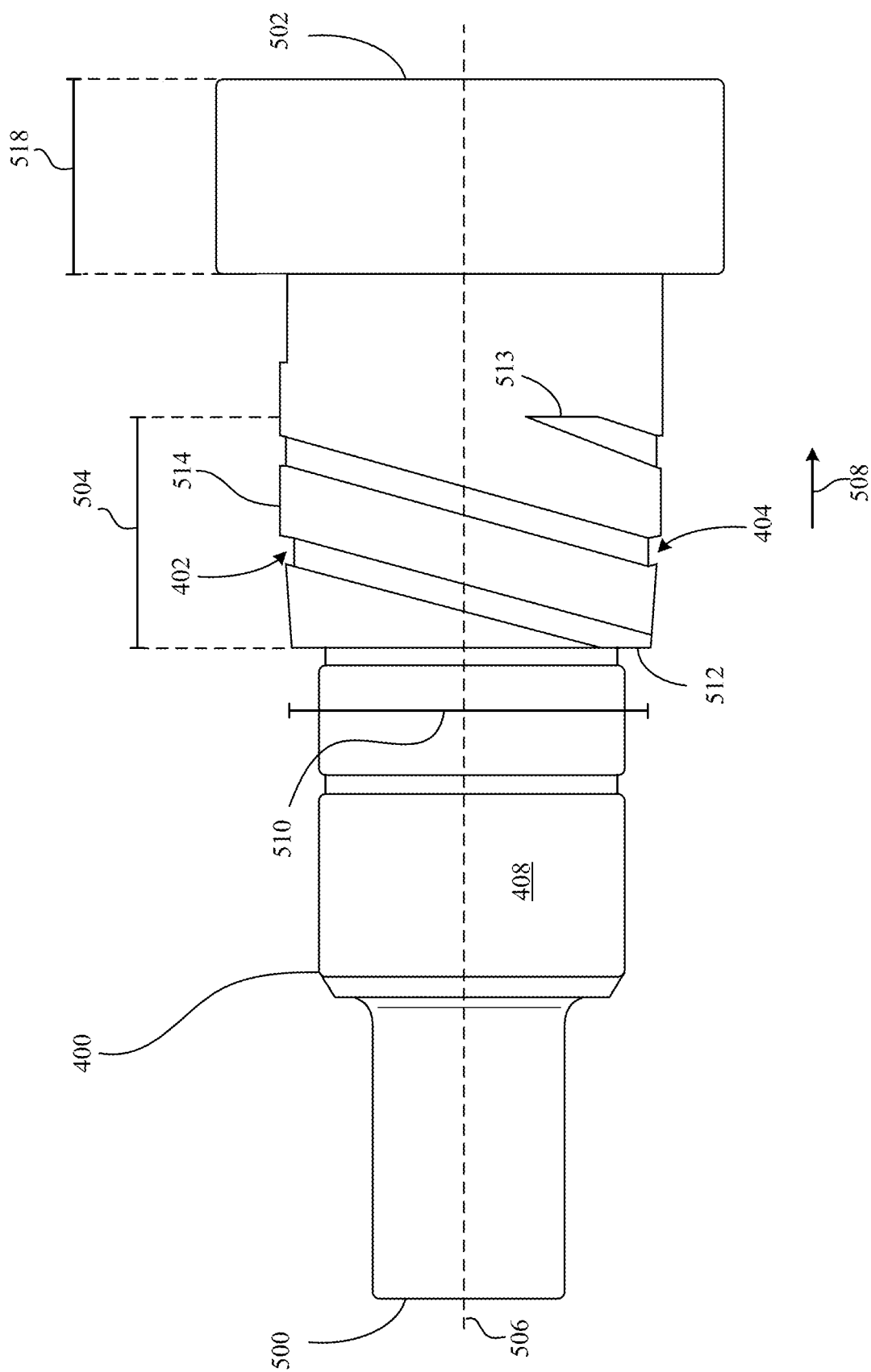
FIG. 5 is a detailed view of an example shaft associated with the example pump of FIGS. 3 and 4.

FIG. 5 is a detailed view of the third shaft 400 associated with the pump 302 of FIGS. 3 and 4. As shown in FIG. 5, the third shaft 400 includes the aforementioned groove(s) 402, 404 to pump the fluid the fluid 308, two of which are shown in this example (i.e., a first groove 402 and a second groove 404). The groove(s) 402, 404 of FIG. 5 are formed by the outer surface 408 of the third shaft 400 and extend at least partially between a first end 500 of the third shaft 400 and a second end 502 of the third shaft 400 opposite the first end 500. In some examples a first particular portion 504 of the outer surface 408 third shaft 400 has the groove(s) 402, 404 positioned thereon such that the grooves 402, 404 extend across the portion 504. As shown in FIG. 5, the first portion 504 is positioned between the ends 500, 502 of the third shaft 400. As the third shaft 400 rotates relative to a second example axis 506 thereof, the fluid 308 flows through the groove(s) 402, 404 from the second cavity 322 to the first cavity 306 along the second axis 506 at least partially in a first direction 508.

In some examples, the first portion 504 of the third shaft 400 is tapered, which facilities moving and/or accelerating the fluid 308 through the groove(s) 402, 404. That is, an outer diameter 510 of the third shaft 400 increases across this particular first portion 504 of the third shaft 400. In such examples, the groove(s) 402, 404 extend both across the first portion 504 and radially outward relative to the second axis 506. Further, in some examples, the groove(s) 402, 404 are helical. That is, the groove(s) 402, 404 extend across the first portion 504 at the outer diameter 510 and at least partially around the outer surface 408 relative to the second axis 506 by an angle (e.g., 30 degrees, 90 degrees, 180 degrees, 360 degrees, etc.). In any case, at least the first groove 402 has a first end 512 that substantially aligns with and/or is proximate to the outlet 420 of the second channel 326 when the third shaft 400 rotates which facilitates drawing the fluid 308 from the second channel 326. Further, at least the first groove 402 has a second end 513 that is positioned proximate to the clutch 300, which facilitates filling the first cavity 306.

Additionally or alternatively, in some examples, to similarly pump the fluid 308, the third shaft 400 includes one or more protrusions (e.g., formed by the groove(s) 402, 404) 514 that extend along the outer surface 408 radially outward relative to the second axis 506 of the third shaft 400. Although FIG. 5 depicts aspects of the groove(s) 402, 404, in some examples, such aspects likewise apply to the protrusion(s) 514.

In some examples, the third shaft 400 includes a second particular portion 518 of the outer surface 408 at or near the second end 502 that is structured and/or configured to receive one or more components (e.g., one or more clutch discs or plates) associated with the clutch, as discussed further below in connection with FIG. 6.

Figure 6:
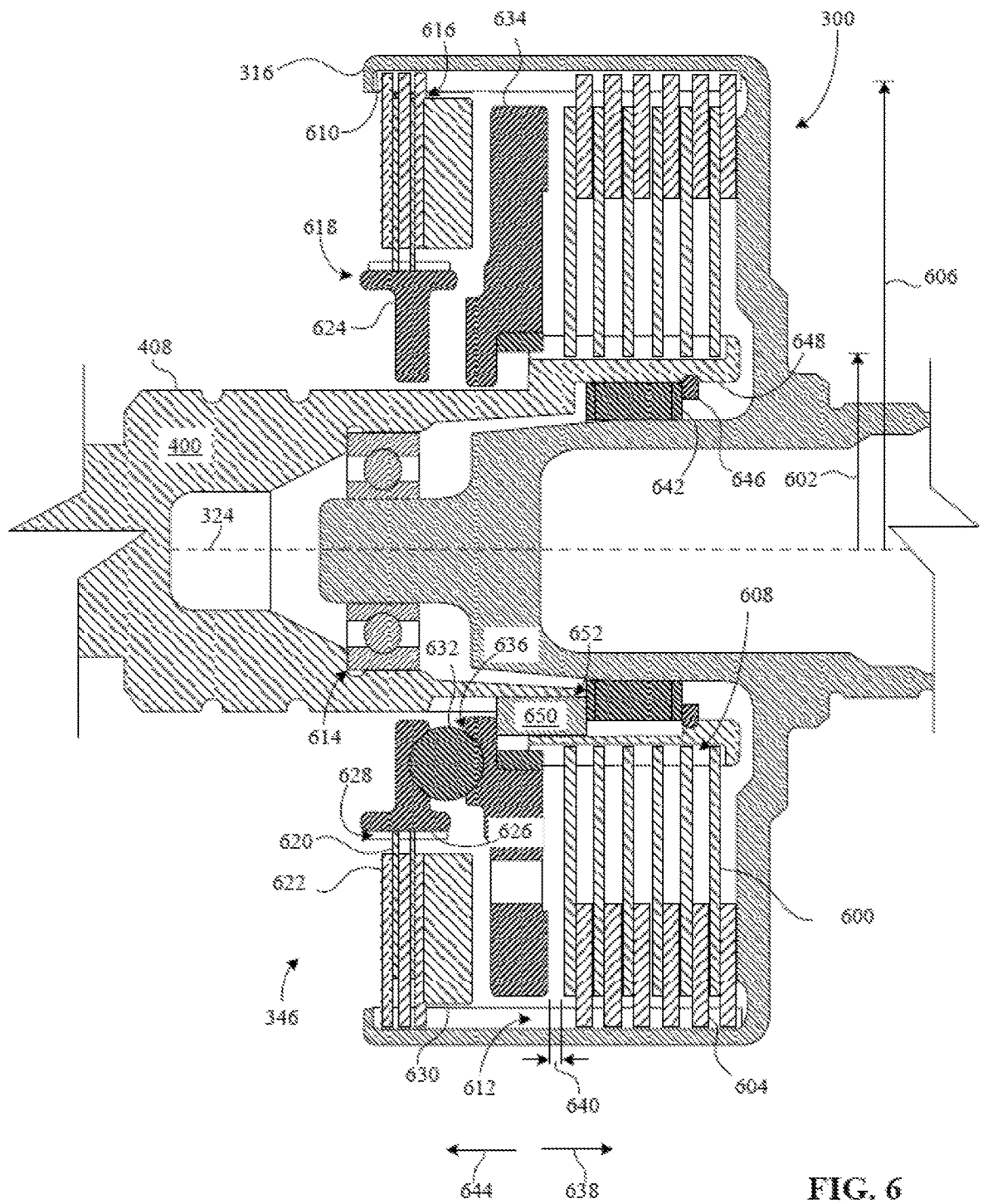
FIG. 6 is an enlarged portion-view of the example clutch of FIG. 3 and shows part of an example actuator system.

FIG. 6 is an enlarged portion-view of the clutch 300 of FIG. 3 and shows part of the actuator system 346. As previously mentioned, the clutch 300 transfers torque between the first and second shafts 204, 206 based on a state of the clutch 300. To facilitate transferring torque, the clutch 300 includes one or more inner disc or plates 600 (six of which are shown in this example) positioned at or near an inner radius 602 of the clutch 300 that rotate cooperatively with third shaft 400 relative to the first axis 324. The clutch 300 of FIG. 6 also includes one or more outer plates or discs 604 (six of which are shown in this example) positioned at or near an outer radius 606 of the clutch 300 that rotate cooperatively with the clutch housing 316. The clutch plates 600, 604 of FIG. 6 are annularly shaped and may be referred to as clutch pack. In particular, to generate torque, the inner plate(s) 600 and outer plate(s) 604 of FIG. 6 slidably engage each other such that the inner plate(s) 600 impart a pressure and/or a force on the outer plate(s) 604 and vice versa).

In some examples, when the clutch 300 is in the first state, the inner plate(s) 600 substantially disengage (e.g., separate) from the outer plate(s) 604 such that torque is not generated thereby or a relatively low degree of torque is generated. That is, in some such examples, the inner plate(s) 600 are spaced from and/or rotate relative to the outer plate(s) 604. As a result, in such examples, the clutch 300 does not transfer torque between the second shaft 206 and the first shaft 204 or transfers a relative low degree of torque therebetween. Conversely, when the clutch 300 is in the second state, the inner plate(s) 600 engage or directly contact the outer plate(s) 604 to transfer torque between the first and second shafts 204, 206.

In some examples where the first and second shafts 204, 206 disconnect from each other, one or more of the clutch plates 600, 604 are shaped and/or formed to facilitate separation therebetween. For example, the clutch plate(s) 600, 604 include one or more waves and/or lobes. In other examples, the clutch plates 600, 604 are substantially flat or straight.

In some examples, the inner plate(s) 600 and/or the third shaft 400 include splines to facilitate coupling together. As shown in FIG. 6, the third shaft 400 includes one or more slots 608 (two of which are shown in this example) positioned thereon and radially distributed relative to the first axis 324 such that the inner plate(s) 600 are moveable in the slot(s) 608. Each of the inner plate(s) 600 is at least partially positioned in the slot(s) 608 to engage the outer surface 408 of the third shaft 400, thereby transferring torque while substantially maintaining an orientation thereof relative to the third shaft 400. Further, each of the inner plate(s) 600 extends out of the respective slot(s) 608 radially outward relative to the first axis 324 to overlap with and/or receive at least one of the outer plates 604. In this example, the slots 608 of the third shaft 400 are formed by the outer surface 408 and extend across the second portion 518 thereof.

Similarly, in some examples, the outer plate(s) 604 and/or an inner surface 610 of the third housing 316 include splines to facilitate coupling together. As shown in FIG. 6, the third housing 316 includes one or more other slots 612 (two of which are shown in this example) positioned thereon and radially distributed relative to the first axis 324. Each of the outer plate(s) 604 is at least partially positioned in the slot(s) 612 to engage the inner surface 610 of the third housing 316, thereby transferring torque while substantially maintaining an orientation thereof relative to the third housing 316. Further, each of the outer plate(s) 604 extends out of the slots) 608 radially inward relative to the first axis 324 to overlap with and/or receive at least one of the inner plates 600. In this example, the slots 608 of the third housing 316 are formed by the inner surface 610 and extend across at least a portion of the third housing 316 along the first axis 324.

In some examples, the third shaft 400 is rotatably coupled to a portion of the clutch housing 316, for example, via a fourth bearing (e.g., a radial ball bearing) 614, as shown in FIG. 6. The fourth bearing 614 of FIG. 6 is coupled between the third shaft 400 and the third housing 316, which stabilizes rotation of the third shaft 400 and the inner disc(s) 600.

The actuator system 346 of FIG. 6 includes an example pilot clutch 616, an example cam 618 (sometimes referred to as a ball ramp cam), and the solenoid 348 of FIG. 3. According to the illustrated example of FIG. 6, the pilot clutch 616 is operatively coupled between the cam 618 and the solenoid 348 to actuate the cam 618 based on output of the solenoid 348, which controls the state of the clutch 300.

Similar to the clutch 300, the pilot clutch 616 of FIG. 6 includes one or more inner discs or plates 620 (two which are shown in this example) and one or more outer discs or plates 622 (two of which are shown in this example) that slidably engage each other to generate a torque for rotating a first portion 624 (sometimes referred to as a pilot cam) of the cam 618. As shown in FIG. 6, the inner plate(s) 620 and/or an outer surface 626 of the first portion 624 of the cans 618 include splines to facilitate coupling together, which allows inner plate(s) 620 and the first portion 624 to cooperative rotate together relative to the first axis 324. As shown in FIG. 6, the outer surface 626 includes one or more slots 628 (two of which are shown) positioned thereon that receive at least a portion of the inner plates) 620. Further, the outer plate(s) 622 and/or the inner surface 610 of the clutch housing 316 similarly include splines to facilitate coupling together, which allows the outer plate(s) 622 and the clutch housing 316 to rotate cooperatively relative to the first axis 324. For example, the slot(s) 612 of the clutch housing 316 receive at least a portion of the outer plate(s) 622.

The pilot clutch 616 of FIG. 6 also includes a portion 630 operatively coupled to the solenoid 348 and configured to squeeze the plates 620, 622 based on output provided by the solenoid 348. For example, the magnetic field and/or force generated by the solenoid 348 is imparted on and/or received by the portion 630 of the pilot clutch 616, thereby causing the portion 630 to move toward a nearest one of the outer plates 622 and/or otherwise squeeze the plates 620, 622 together. As a result, rotation of the clutch housing 316 causes the plates 620, 622 and the first portion 624 of the cam 618 to rotate, thereby actuating the cam 618.

The cam 618 of FIG. 6 includes one or more balls 632 (e.g., radially distributed relative to the first axis 324) interposed between the first portion 624 and a second portion 634 (sometimes referred to as a main cam) of the can 618 to facilitate actuation of the cam 618, one of which is shown in this example. As shown in FIG. 6, the second portion 634 is in a first or retracted positioned. Each of the balks) 632 of FIG. 6 is positioned in a respective pocket 636 formed by the first and second portions 624, 634, as discussed further below in connection with FIGS. 7 and 8. In particular, the balks) 632 engage the first and second portions 624, 634 as the first portion 624 rotates relative to the second portion 634, thereby stroking the cam 618 and/or urging the second portion 634 away from the first portion 624 from the first position to a second or extended position to engage a nearest one of the plates 600, 604.

According to the illustrated example of FIG. 6, when the cam 618 strokes, the second portion 634 of the cam 618 moves away from the first portion 624 along the axis 324 in a second direction 638 to squeeze the plates 600, 604 of the clutch 300 and/or otherwise increase a pressure between the plate(s) 600, 604, which provides the second state of the clutch 300. In some examples where the first and second shafts 204, 206 disconnect from each other, the second portion 634 moves across a gap 640 existing between the second portion 634 and a nearest one of the inner plate(s) 600 of the clutch 300, as shown in FIG. 6. In such examples, when the cam 618 is not actuated and/or the second portion 634 is in the retracted position, the cam 618 does not load the clutch plates 600, 604 such that the clutch plates 600, 604 are separated from each other. However, in some examples, the second portion 634 of the cam 618 maintains contact with one of the inner plate(s) 600 when in the retracted position to at least partially load the clutch plates 600, 604.

Additionally, in some examples, the clutch 300 includes an example spring 642 operatively coupled to the second portion 634 of the cam 618 to urge the second portion 634 toward the first portion 624 of the cam 618 along the first axis 324 in a third direction 644 opposite the second direction 638. In this manner, the first portion 624 of the cam 618 maintains a position between the ball(s) 632 and the third bearing 442, which prevents the ball(s) 632 from falling out of respective ones of the pockets) 636. The spring 642 of FIG. 6 is positioned between the third shaft 400 and the clutch housing 316 such that the spring 642 does not interfere with rotation therebetween. In some examples, to maintain a position of the spring 642 and/or limit movement thereof, the third shaft 400 includes one or more travel stops (e.g., a collar) 646 coupled to an inner surface (e.g., a circumferential surface) 648 of the third shaft 400 that surrounds at least a portion of the clutch housing 316 and contact the spring 642.

Further, in some such examples, the clutch 300 includes one or more example pins 650 interposed between the spring 642 and the second portion 634 of the earn 61 to transfer a force from the spring 642 to the second portion 634. Each of the pin(s) 650 of FIG. 6 are slidably disposed in a respective bore 652 that extends through third shaft 400 substantially along the first axis 324. In some examples, the pin(s) 650 and the respective bore(s) 652 are radially distributed relative to the first axis 324, which allows the second portion 624 of the earn 618 to substantially maintain a proper orientation thereof when moving across the gap 640.

Although FIG. 6 depicts the actuator system 346 as an electric actuator, in some examples, the actuator, system 346 is implemented differently, for example, as a pneumatic actuator that may include one or more of a motor, a pump, a valve, and/or a piston to similarly control the state of the clutch 300 by actuating the pilot clutch 616 and/or the cam 618.

Figures 7, 8:
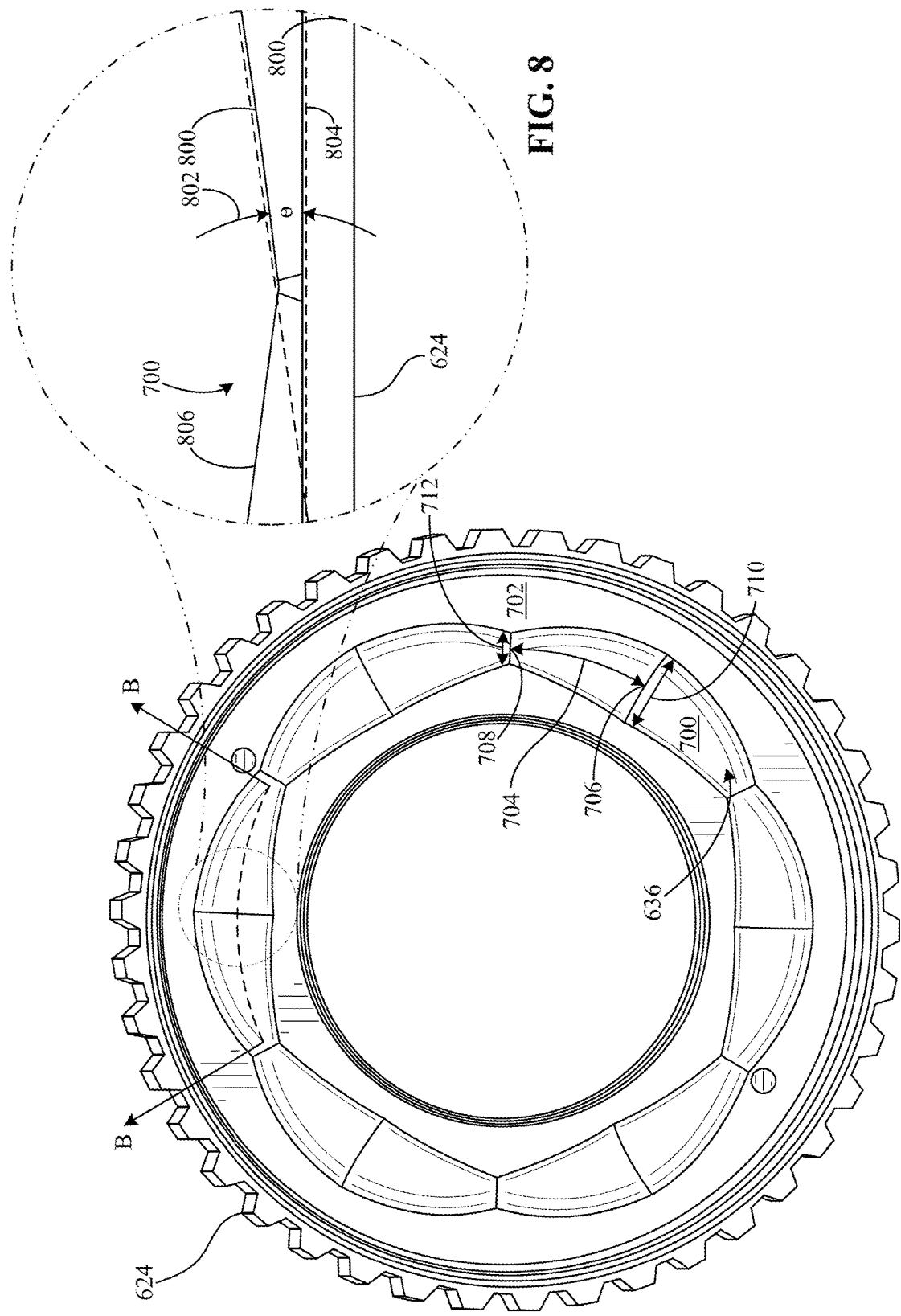
FIG. 7 is a detailed view of an example portion of an example cam in accordance with the teachings of this disclosure.
FIG. 8 is a cross-sectional view of the example portion of the example cam of FIG. 7 along line B-B.

FIG. 7 is a detailed view of the first portion 624 of the cam 618 of FIG. 6 and shows example recessed areas 700 positioned on an outer surface 702 of the first portion 624, six of which are shown in this example. For simplicity, FIG. 7 depicts aspects in connection with a single 700 recessed area (i.e., a first recessed area 700). However, such aspects likewise apply to one or more of the other recessed areas 700.

The first recessed area 700 of FIG. 7 extends into the outer surface 702 to at least partially form a respective one of the pocket(s) 636. Stated differently, a pocket 636 defines the first recessed area 700. In particular, the first recessed area 700 includes and/or defines an example path (e.g., a radial or curved path) 704 for a ball 632 to follow. That is, the first recessed area 700 engages the ball 632 to guide movement thereof between a first end 706 and a second end 708 of the path 704 as the first and second portions 624, 634 of the cam 618 rotate relative to each other. More particularly, the first recessed area 700 is sized, shaped, structured, and/or otherwise configured such that when the ball 632 moves from the first end 706 to the second end 708, the second portion 634 moves away from the first portion 624 to the extended position. Conversely, when the ball 632 moves from the second end 708 to the first end 706, the second portion 634 moves toward the first portion 624 to the retracted position.

In some examples, a first width 710 of the first recessed area 700 at the first end 706 of the path 704 is greater than a second width 712 of the first recessed area 700 at the second end 708 of the path 704. Additionally, a portion of the first recessed area 700 at the first end 706 extends further into the outer surface 702 than a different portion of the first recessed area 700 at the second end 708.

FIG. 8 is a cross-sectional view of the first portion 624 of the cam 618 of FIG. 7 along line B-B and shows one of the first recessed areas 700. In particular, the first recessed area 700 includes a first angled or sloped portion 800 that is substantially flat or even. In particular, an angle 802 formed by the first angled portion 800 and a third axis 804 of the cam 624 is 45 degrees or less, which provides proper torque capacity for the clutch 300 as well as a low draw torque and a sufficient lash angle. In some examples, the angle 802 is 23 degrees or about 23 degrees (e.g., +/−5 degrees).

Further, in some examples, these aspects of the first angled portion 800 likewise apply to a second angled or sloped portion 806 of the first recessed area 700 that is adjacent the first angled portion 800. Further still, although FIGS. 7 and 8 depict aspects in connection with the first portion 624 of the cam 618, in some examples, such aspects likewise apply to the second portion 634 of the cam 618.

Figure 9:
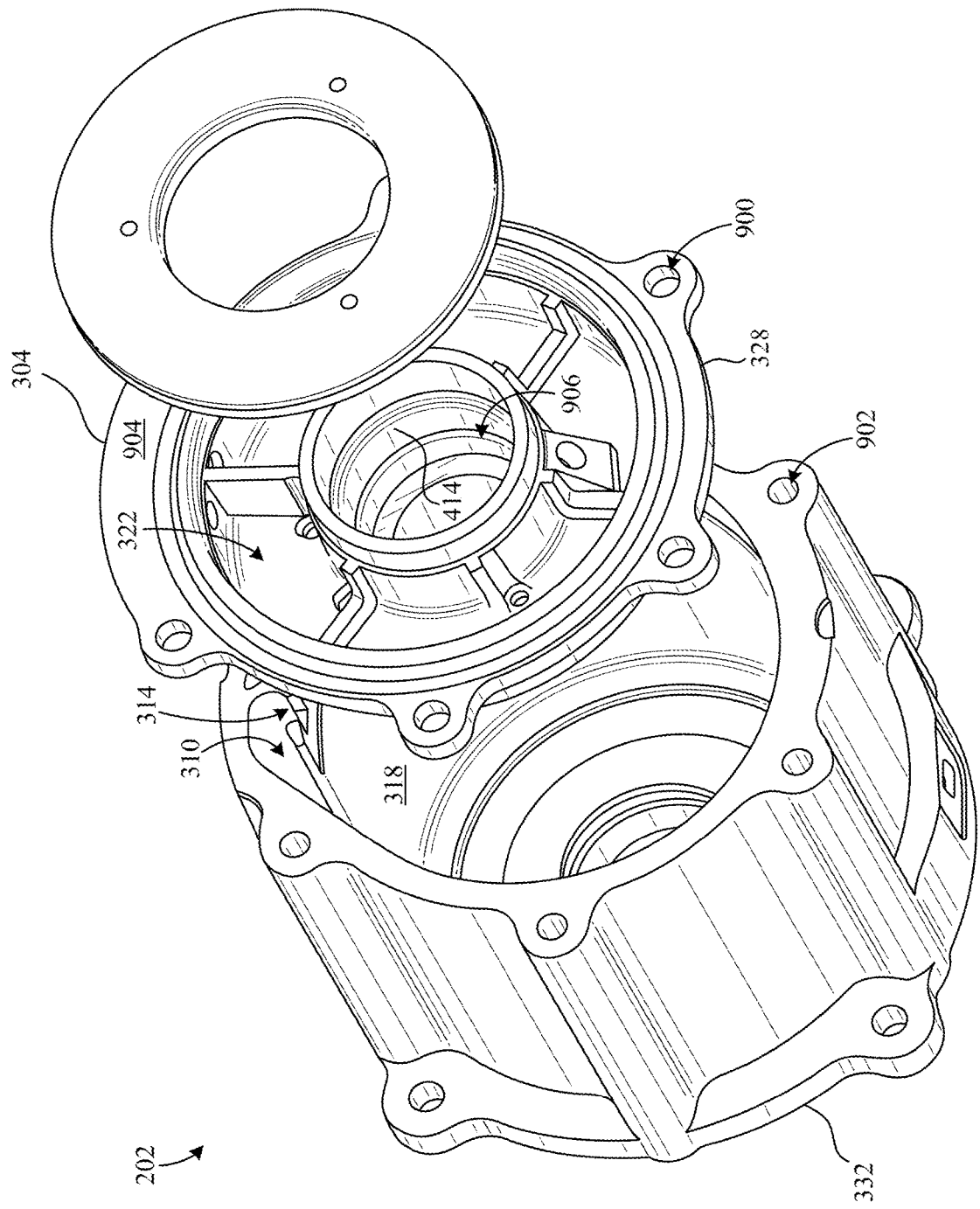
FIG. 9 is a partial exploded-view of the example clutch coupling assembly of FIGS. 2 and 3.

FIG. 9 is a partial exploded-view of the clutch coupling assembly 202 of FIGS. 2 and 3 and shows the second portion 332 of the first housing 208 and the tank 304. As shown in FIG. 9, the second portion 332 includes the outlet 314 of the first channel 310 at least partially formed by the inner surface 318 of the housing 208. Similarly, in some examples, the inner surface 318 at least partially forms the inlet 314 of the first channel 310.

In some examples, to facilitate coupling (e.g., removably coupling) the tank 304 to the second portion 332, the tank 304 includes one or more apertures 900 (e.g., radially distributed relative to the first axis 324) positioned at or near an outer radius of the tank 304, for example, formed by the flange 328. The aperture(s) 900 align with one or more respective apertures 902 similarly positioned on the second portion 332 of the housing 208. Each aperture 900, 902 receives a fastener (e.g., a bolt, a screw, etc.), thereby coupling the tank 304 to the first housing 208. In some examples, when coupled to the second portion 332, the flange 328 includes an extension 904 extending radially outward relative to the first axis 324 that partially forms the first channel 310 and/or the outlet 314 thereof.

As shown in FIG. 9, the tank 304 has an opening 906 extending therethrough to receive at least a portion of the third shaft 400. In particular, the opening 416 defines the inner surface 414 of the wall 410 that facilitates pumping the fluid 308 via the third shaft 400. In some examples, a cross-sectional shape (e.g., circular) of the opening 906 matches a cross-sectional shape of the third shaft 400. Further, in examples where the third shaft 400 is tapered, a diameter of the opening 906 increases or decrease across at least a portion of a length of the opening 906 corresponding to the first portion 504 of the third shaft 400.

It will be appreciated that the fluid control apparatus for use with vehicles disclosed the foregoing description provide numerous advantages. Examples disclosed herein control a flow of a fluid associated with vehicle clutch to reduce and/or eliminate fluid drag experienced by one or more clutch components during certain driving conditions. Disclosed examples improve vehicle fuel economy and allow for disconnecting driveline architecture of a vehicle. Disclosed examples also improve thermal characteristics associated with one or more components of a clutch coupling assembly. Disclosed examples also reduce costs typically associated with known clutch couplings.

Although certain example apparatus and articles of manufacture have been disclosed herein, the scope of coverage of this patent is not limited thereto. Obviously, numerous modifications and variations are possible in light of the above teachings. It is therefore to be understood that within the scope of the appended claims, the invention may be practiced other rise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A clutch coupling assembly for a vehicle, comprising:
a housing defining a cavity;
a fluid reservoir fluidly coupled to the cavity;
a clutch positioned in the cavity, rotation of the clutch conveys a fluid from the cavity to the fluid reservoir via a first fluid channel; and
a pump operatively coupled to the housing, operation of the pump conveys the fluid from the fluid reservoir to the cavity via a second fluid channel when the clutch is in an engaged state, wherein
when the vehicle operates in a first operating mode a first flow rate through the first fluid channel is greater than a second flow rate through the second fluid channel such that the fluid evacuates the cavity until a first fluid level is reached in the cavity, and
when the vehicle operates in a second operating mode, where the clutch is in the engaged state, the second flow rate is greater than the first flow rate such that the fluid evacuates the fluid reservoir until a second fluid level greater than the first fluid level is reached in the cavity, wherein the pump includes a shaft positioned at least partially in the cavity and including a groove on an outer surface of the shaft, the fluid flows through the groove toward the clutch when the shaft rotates, and wherein the groove is helical.

2. The clutch coupling assembly of claim 1, wherein a portion of the shaft corresponding to the groove is tapered.

3. The clutch coupling assembly of claim 1, wherein the groove extends across a portion of a length of the shaft and radially outward relative to an axis of the shaft.

4. The clutch coupling assembly of claim 1, wherein the groove includes a first end positioned proximate to an outlet associated with the fluid reservoir and a second end positioned proximate to the clutch.

5. The clutch coupling assembly of claim 1, wherein the shaft is coupled between a portion of the clutch and a vehicle driveshaft to transfer torque therebetween.

6. The clutch coupling assembly of claim 1, wherein the clutch, when in a disengaged state, disconnects a driveshaft of the vehicle from one or more road wheels of the vehicle such that rotation of the road wheels does not cause the driveshaft to rotate.

7. The clutch coupling assembly of claim 6, wherein the clutch includes a clutch pack defining an outer plate and an inner plate that slidably engage each other to transfer torque between the driveshaft and the road wheels, the inner plate spaced from the outer plate when the clutch is in the disengaged state.

8. The clutch coupling assembly of claim 7, wherein the clutch includes a cam having first and second portions operatively coupled together, rotation of the first portion relative to the second portion to cause the second portion to move across a gap defined between the second portion and the clutch pack to engage the inner or outer plate.

9. The clutch coupling assembly of claim 8, wherein the cam includes a ball positioned in a pocket formed by the first and second portions of the cam, the pocket defining a surface that is engaged with the ball and forms an angle relative to an axis of the cam that is 45 degrees or less.

10. The clutch coupling assembly of claim 8, wherein the clutch includes a spring operatively coupled to the second portion of the cam to urge the second portion toward the first portion.

11. The clutch coupling assembly of claim 1, wherein the fluid reservoir includes a tank that is coupled to the housing and at least partially defines the cavity with the housing.

12. The clutch coupling assembly of claim 11, wherein the first fluid channel extends from the cavity to the tank and the second fluid channel extends from the tank to the pump.

13. The clutch coupling assembly of claim 12, wherein the first fluid channel is at least partially formed by a wall of the housing.

14. The clutch coupling assembly of claim 13, wherein the first fluid channel extends through the wall at or near an outer diameter of the housing to an opening positioned on the tank.

15. The clutch coupling assembly of claim 12, wherein the second fluid channel is at least partially formed by a wall extending from the tank toward the clutch.

16. The clutch coupling assembly of claim 1, wherein in the first operating mode the clutch is in a disengaged state which disconnects a driveshaft of the vehicle from one or more road wheels of the vehicle.

17. The clutch coupling assembly of claim 16, wherein in the second operating mode the clutch is in the engaged state which connects the driveshaft of the vehicle to the one or more road wheels.

* * * * *